United States Patent [19]

Terai

[11] Patent Number: 5,218,484
[45] Date of Patent: Jun. 8, 1993

[54] LENS FRAME

[75] Inventor: Takashi Terai, Tokyo, Japan

[73] Assignee: Pioneer Electronic Corporation, Tokyo, Japan

[21] Appl. No.: 774,896

[22] Filed: Oct. 11, 1991

[30] Foreign Application Priority Data

Oct. 17, 1990 [JP] Japan .............. 2-107979[U]

[51] Int. Cl.⁵ .............................. G02B 7/02
[52] U.S. Cl. .................... 359/823; 359/827
[58] Field of Search ............. 359/819, 827, 822, 823

[56] References Cited

U.S. PATENT DOCUMENTS

| 3,202,049 | 8/1965 | Bond | 359/819 |
| 4,153,340 | 5/1979 | Uesugi | 359/819 |
| 4,526,440 | 7/1985 | Lundberg et al. | 359/827 |
| 5,054,886 | 10/1991 | Ozaki et al. | 359/819 |

FOREIGN PATENT DOCUMENTS 1-254908  10/1989  Japan .................. 359/819

Primary Examiner—Bruce Y. Arnold
Assistant Examiner—James Phan
Attorney, Agent, or Firm—Sughrue, Mion, Zinn, Macpeak & Seas

[57] ABSTRACT

A lens frame consists of a lens barrel with a built-in projection lens and a support member in which the lens barrel is inserted and supported. The lens barrel has on its outer surface a pair of axially spaced projections as a slide member. The support member has on its inner surface projected guide strips that extend inclined with respect to a plane perpendicular to the axis of the support member. The support member also has axially extending ribs on the inner surface that tightly engage with the outer surface of the lens barrel as the latter is inserted into the former, in order to keep their axes aligned. With the lens barrel inserted and the projected guide strip received between the paired projections, the lens barrel is rotated and the paired projections are guided along the inclined projected guide strip, causing the lens barrel to move forward or backward in the axial direction. In this way, the focus adjustment can easily be made. The tight engagement between the ribs and the lens barrel produces contact friction that helps prevent the lens barrel from being turned inadvertently after the focus adjustment is made.

8 Claims, 6 Drawing Sheets

LENS FRAME

BACKGROUND OF THE INVENTION

1. Field of the Invention

The present invention relates to a lens frame mounted in an image projection equipment such as projection television and more particularly to a lens frame in which a lens barrel is rotated to be moved in the direction of lens light axis to adjust a focus of the lens when projecting a CRT image or a liquid crystal display image on a screen.

2. Prior Art

FIG. 6 shows an image projection apparatus in the projection television of this kind. In the Figure, a lens barrel 10 which has a built-in projection lens is supported on a lens barrel support 20, which is mounted on a projection tube 40 through an optical coupler 30.

An image formed by the projection tube 40 is projected onto a screen 50 by a projection lens contained in the lens barrel 10.

FIGS. 7 to 9 show conventional lens frames of this kind, which are described below.

The lens barrel 10 shaped like a circular cylinder is fitted in a cylinder portion 20a of the lens barrel support 20. The cylinder portion 20a is formed with a groove 20b which is inclined with respect to the circumferential direction and through which the lens barrel 10 is attached with a fixing portion 60. The fixing portion 60, as shown in FIG. 8, has a screw 60a screwed through a thumbnut 60b, a washer 60c and a collar into a projection 10a formed on the side of the lens barrel 10, with the collar 60d fitted in the groove 20b of the cylinder portion 20a.

When the lens barrel 10 is rotated relative to the lens barrel support 20 and the collar 60d is slid along the groove 20b, the lens barrel 10 is moved along the axis of the cylinder to adjust the focus on the screen.

With the lens in focus, the thumbnut 60b is turned to press the lens barrel 10 against the cylinder portion 20a of the lens barrel support 20, thus fixing the lens barrel 10 to the lens barrel support 20.

In such a lens frame, a guide portion for guiding the lens barrel 10 in a longitudinal direction is the groove 20. When the lens barrel support 20 is to be formed by a plastic projection molding, the groove 20b constitutes an undercut and cannot be formed by upper and lower molding dies alone, requiring a slide core for making the groove 20b. This makes the structure of the dies complex, which in turn increases the cost and makes the maintenance complex.

Furthermore, the fixing portion 60 has a number of parts. Assembly of the lens barrel 10 and the lens barrel support 20 requires many steps, i.e., aligning the projection 10a of the lens barrel 10 with the groove 20b in the cylinder portion 20a, fitting the thumbnut 60b, the washer 60c and the collar over the screw 60a, and driving the screw 60a into the projection 10a of the lens barrel 10.

Another problem is that if the axis of the lens barrel 10 and the cylinder portion 20a are aligned as shown in FIG. 9a before they are fastened together by the thumbnut 60b, the turning and tightening of the thumbnut causes the lens barrel 10 to be pressed against the inner surface of the cylinder portion 20a at the fixing portion 60, shifting the axis of the lens barrel 10 out of alignment with the axis of the cylinder portion 20a, as shown in FIG. 9b.

As a result, the center axis of the lens barrel support 20, which is fixed in a specified optical position relative to the coupler 30, becomes deviated from the center axis (lens optical axis) of the lens barrel 10, bringing the image out of focus.

SUMMARY OF THE INVENTION

This invention has been accomplished to overcome the above-mentioned drawbacks of the conventional lens frame. A primary object of the invention is to provide a lens frame which can be formed by only upper and lower molding dies, so that the cost of the dies can be reduced and their maintenance made easy. Another object is to provide a lens frame which has a small number of parts permitting an easy and simple setup and which does not produce any deviation of the optical axis of the lens barrel when the lens barrel is fixed after focus adjustment is made.

To achieve the above objectives, the lens frame according to this invention comprises: a lens barrel containing a lens; a support member having an inner surface in which the lens barrel is inserted and supported; at least one projected strip formed as a guide member on one of the inner surface of the support member and the outer surface of the lens barrel, said projected strip extending inclined with respect to a plane perpendicular to the lens barrel axis, said at least one projected strip having opposite ends defining a gap therebetween; and a pair of projections formed as a slide member on the other of said outer surface of the lens barrel and said inner surface of the support member, said paired projections being so arranged that when the lens barrel is inserted into the support member such that the lens barrel when it is at a specified relative angle with the support member, one of the paired projections passes through the gap formed between the opposite ends of the projected strip; whereby as the lens barrel, after being inserted into the support member, is rotated, the paired projections are guided along the inclined projected strip, moving the lens barrel axially in the support member.

In the lens frame of this invention, the lens barrel is inserted into the support member until the lower one of the two projections on the lens barrel comes below the projected strip of the support member. The lens barrel is then rotated to accommodate the projected strip between the paired projections. By changing the rotating angle of the lens barrel, it is possible to change the axial position of the lens barrel with respect to the support member and thereby adjust the lens focus on the screen. This construction facilitates assembly and makes the focusing operation easy and reliable.

BRIEF DESCRIPTION OF THE DRAWINGS

FIGS. 1 through 5 represent one embodiment of this invention; of which

FIG. 1 is a perspective exploded view of a lens frame of the embodiment;

FIG. 2 is a cross-sectional view of the lens frame in an assembled condition;

FIG. 3 is a developed view showing the relationship between projected guide strips, paired slide projections and a stopper rib;

FIG. 4 is a cross-sectional view of the lens frame with a lens barrel retracted;

FIG. 5 is a cross-sectional view of the lens frame with the lens barrel advanced;

PREFERRED EMBODIMENT OF THE INVENTION

Figure 1:
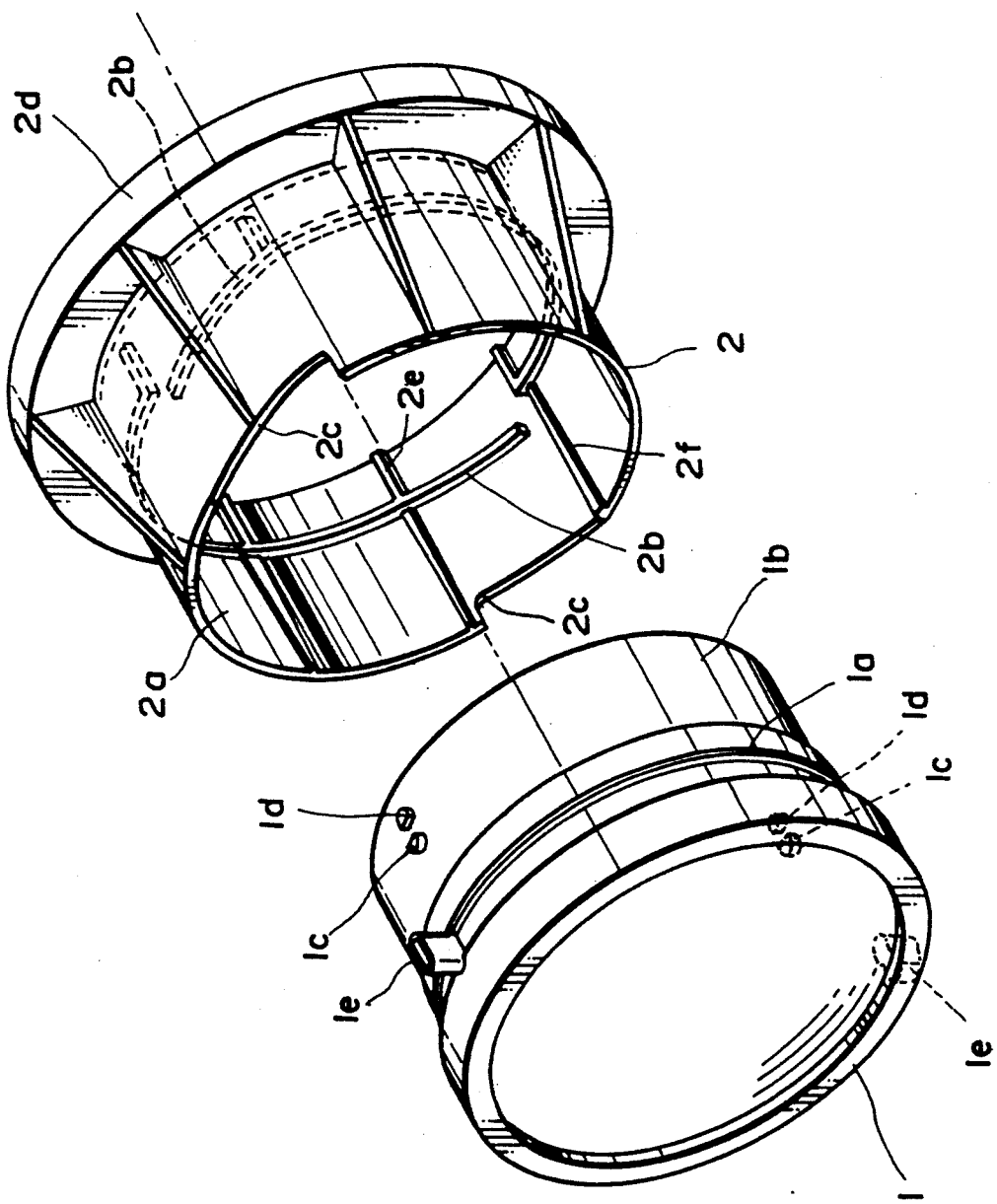
Figure 2:
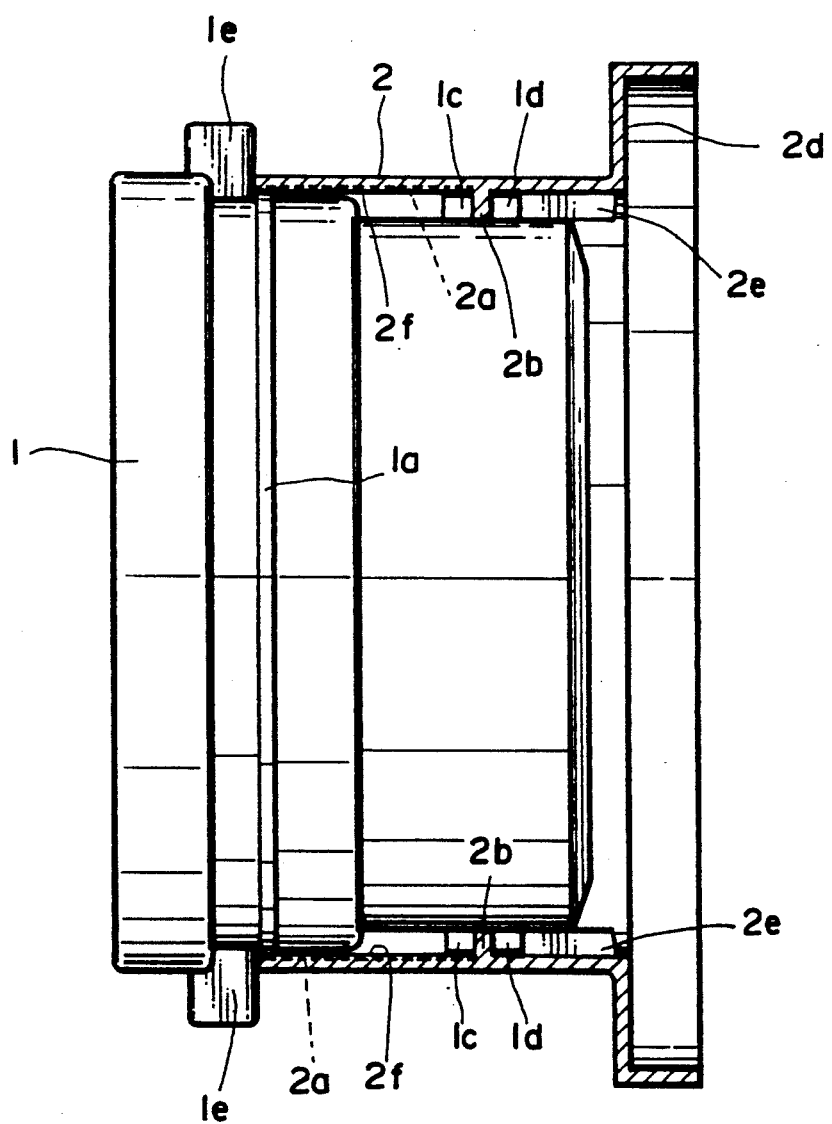

One embodiment of this invention will be described by referring to FIGS. 1 to 5.

Reference numeral 1 represents a lens barrel and 2 represents a lens barrel support into which the lens barrel 1 is inserted.

The lens barrel 1 has a flange portion 1a slightly larger than the inner diameter of ribs 2f formed on a cylindrical inner surface 20a of the lens barrel support 2. Below the flange portion 1a is formed an outer circumferential portion 1b smaller in diameter than the flange portion 1a. On the outer circumferential portion 1b are formed a pair of opposing projections 1c, 1d facing each other with a specified distance between and aligned in a direction of the barrel axis. The lens barrel 1 also has a stopper rib 1e formed on the extension of a line connecting the two projections 1c, 1d at a position spaced a certain distance from the projection 1c.

On the inner surface of the lens barrel support 2 are formed two projected guide strips 2b which will cooperate with the pair of slide projections 1c, 1d. The projected guide strips 2b extend inclined with respect to a plane perpendicular to the barrel axis, and have a width such that they can be inserted between the slide projections 1c and 1d. The projected guide strips 2b are cut nearly vertically at each end. Between the facing ends of the two projected guide strips 2b are formed gaps which are larger than the lateral widths of the projections 1c, 1d.

The upper edge of the lens barrel support 2 is formed with tapered portions 2c that run parallel to the projected guide strips 2b. At the lower end, the lens barrel support 20 is formed with a flange 2d that mounts the lens barrel support 2 on the coupler 30.

On its inner circumferential surface, the lens barrel support 2 has ribs 2e and ribs 2f, both extending along the barrel axis. The ribs 2e come into tight contact with the outer circumferential portion 1b of the lens barrel 1, while the ribs 2f tightly engage with the flange portion 1a of the lens barrel 1.

The lens frame is assembled as follows. With the slide projections 1c, 1d aligned with the gap beside the end of the projected guide strips 2b, the lens barrel 1 is inserted into the lens barrel support 2 until the flange portion 1a is pressed onto the ribs 2f.

Since the distance from the upper surface of the projected guide strip 2b to the tapered upper surface of the portion 2c is equal to the distance from the lower end of the slide projection 1c to the lower end of the stopper rib 1e when the stopper rib 1e abuts against the tapered portion 2c, the lower end of the slide projection 1c stops at a position equal in height to the upper surface of the projected guide strip 2b at the end.

Then, as the lens barrel 1 is rotated relative to the lens barrel support 2, the projected guide strip 2b enters between the slide projections 1c, 1d, which are guided along the inclined projected strip 2b, causing the lens barrel 1 to move in the direction of the barrel axis or lens axis to adjust the focus on the screen 50.

Because the axially extending ribs 2e and ribs 2f formed on the inner circumferential surface of the lens barrel support 2 tightly engage with the outer circumferential portion 1b of the lens barrel 1 and with the flange portion 1a, respectively, the contact friction resulting from their tight engagement produces a restraining force against the lens barrel 1 rotating relative to the lens barrel support 2. This forestalls an inadvertent shifting of focus, which would otherwise result from undesired turning and subsequent axial motion of the lens barrel 1. It also prevents a shifting of the axis of the lens barrel 1 out of alignment with the axis of the lens barrel support 2, which is experienced with the conventional apparatus when the lens barrel is fixed after focus adjustment.

If the gap between the paired slide projections 1c, 1d is set slightly narrower than the width of the projected guide strip 2b, the projected strip 2b enters between the projections 1c, 1d without a play, so that the contact friction between them enhances the lens frame capability of preventing the undesired rotation of the lens barrel 1 with respect to the lens barrel support 2.

Figure 3:
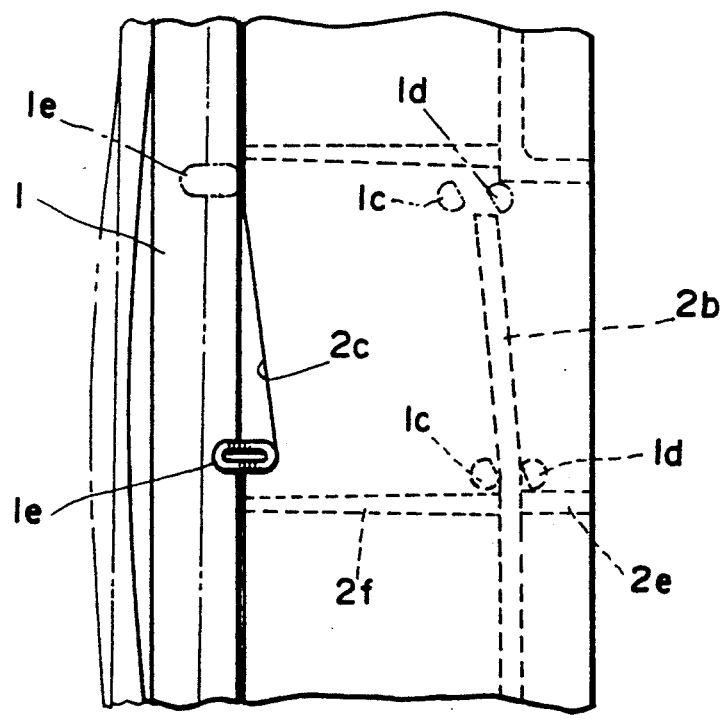
Figure 4:
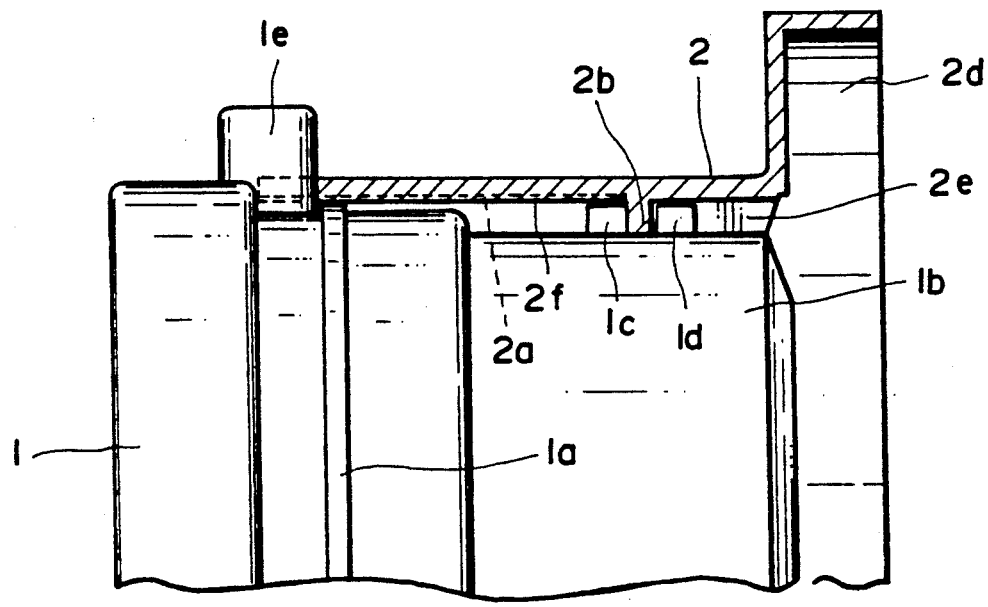
Figure 5:
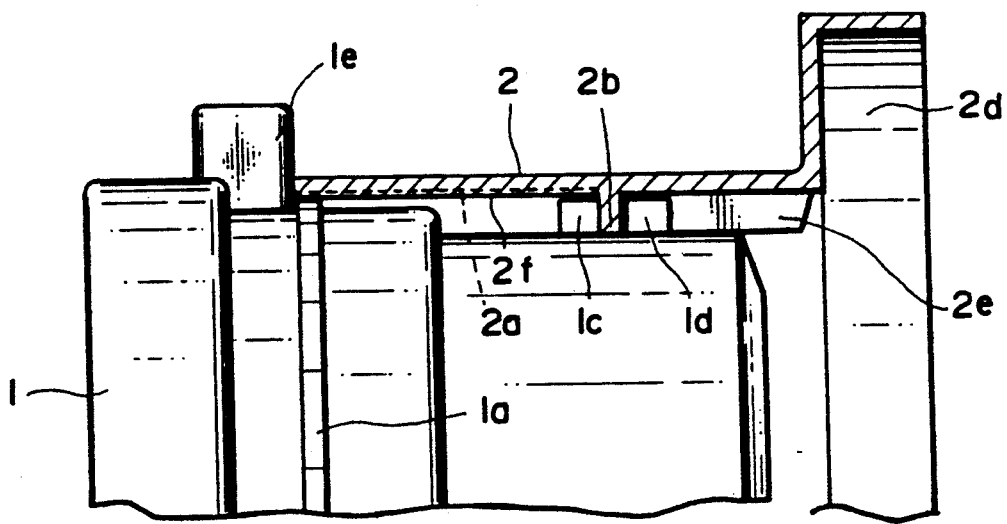
Figure 6:
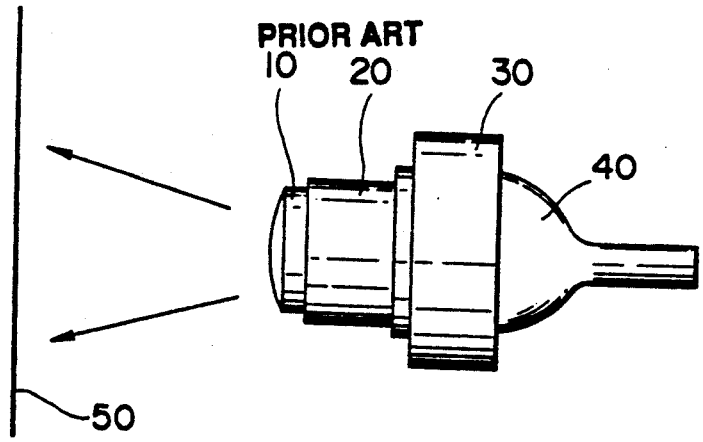
FIG. 6 is a schematic side view of an image projection apparatus used in a projection television according to this invention.
Figure 7:
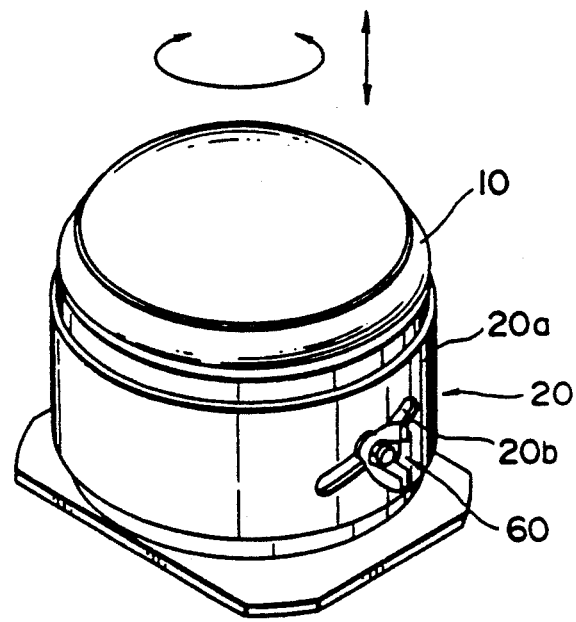
FIG. 7 is a perspective view of a conventional lens frame.
Figure 8:
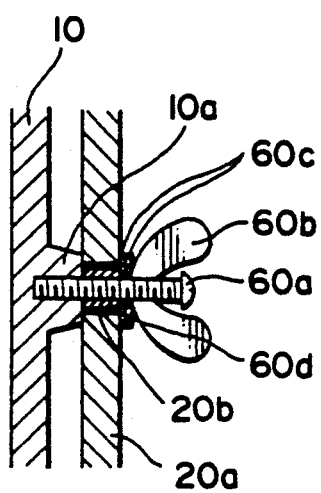
FIG. 8 is a cross-sectional view of a fixing portion of FIG. 7.
Figure 9A:
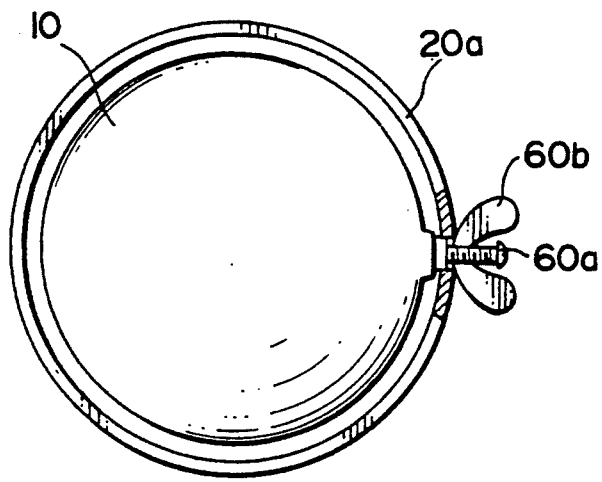
FIGS. 9a and 9b are plan views showing how the lens axis is shifted by the fastening of the lens barrel.
Figure 9B:
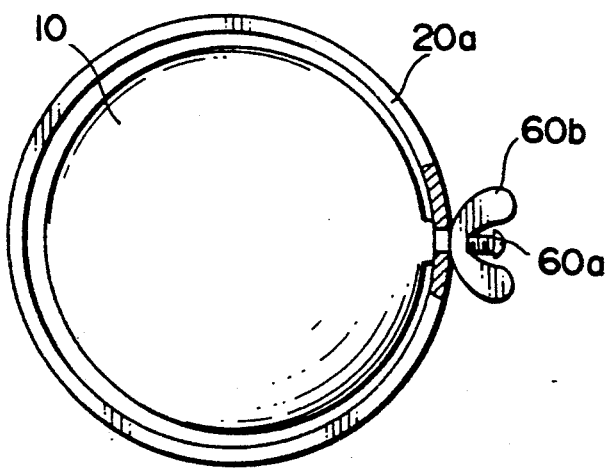

As shown in FIGS. 1 and 3, the paired slide projections 1c, 1d are pillars with an arc cross section. The boundary between a flat surface and an arc surface, when viewed from the side as shown in FIG. 3, is almost in line contact with the upper and lower surfaces of the projected strip 2b. Therefore, the slide projections 1c, 1d are smoothly guided along the inclined projected guide strip 2b, moving the lens barrel 1 in the axial direction, not only when the projected guide strip 2b is inclined linearly as shown in FIGS. 1 and 3 but also when it is inclined in a predetermined curve.

The advantages of this invention may be summarized as follows.

Since the support member that supports the lens barrel is formed with the projected strips as a means for converting the rotation of the lens barrel into its axial movement, the plastic injection molding die for the support member can set a parting line at the position of the projected guide strips. This makes the molded product of the support member undercut-free and the die therefore can be constructed as a simple molding die, composed of only upper and lower dies.

This reduces the die manufacturing cost and also facilitates the maintenance of the dies.

Another advantage is a small number of parts of the lens frame, contributing to a reduction in the parts cost.

Furthermore, simple manipulation of inserting and rotating of the lens barrel in the support member permits adjustment of focus on the screen, greatly improving the operability of the lens frame.

What is claimed is:

1. A lens frame comprising:
    a lens barrel containing a lens and having a longitudinal axis;
    a support member having an inner surface in which the lens barrel is inserted and supported, said support member having a longitudinal axis;
    at least one projected strip formed as a guide member on one of the inner surface of the support member and the outer surface of the lens barrel, said projected strip extending inclined with respect to a plane perpendicular to the longitudinal axis of the lens barrel, said at least one projected strip having opposite ends defining a gap in a circumferential direction therebetween; and a pair of projections formed as a slide member on the other of said outer surface of the lens barrel and said inner surface of the support member, said paired projections being so arranged that when the lens barrel is inserted into the support member such that the lens barrel is at a specified relative angle with the support member, one of the paired projections passes through the gap formed between the opposite ends of said projected strip;

whereby as the lens barrel, after being inserted into the support member, is rotated, said paired projections receive said inclined projected strip to be guided therealong, moving the lens barrel axially in the support member thereby to adjust a focus of the lens.

2. A lens frame as claimed in claim 1, further comprising ribs formed on at least one of the inner surface of the support member and the outer surface of the lens barrel in order to keep the longitudinal axis of the lens barrel in line with the longitudinal axis of the support member and also to produce a sufficient contact friction to prevent the lens barrel from being turned inadvertently relative to the support member.

3. A lens frame as claimed in claim 1, wherein said paired projections, which form slide members, are longitudinally axially spaced from each other by a distance equal to or slightly smaller than a longitudinally axial width of the inclined projected strip to provide a contact friction and thereby enhance the capability of the lens frame of restricting unwanted rotation of the lens barrel.

4. A lens frame as claimed in claim 1, wherein said paired projections are pillars with a cross section other than arc.

5. A lens frame as claimed in claim 1, further comprising a stopper formed on the lens barrel which, when the lens barrel is inserted into the support member at a specified relative angle, stops said paired projections at a position where said inclined projected strip is received between said paired projections as the lens barrel is rotated.

6. A method of assembling and adjusting a lens barrel and a support member, said lens barrel containing a lens having a light axis, said method comprising the steps of:

inserting the lens barrel into the support member at a predetermined relative angle until the lens barrel is stopped by a stopper;

rotating the lens barrel against the friction between the lens barrel and the support member so that paired projections formed on one of the inner surface of the support member and the outer surface of the lens barrel are guided along an inclined projected strip formed on the other of said inner surface of the support member and said outer surface of the lens barrel, in order to adjust the position of the lens barrel along the lens light axis to in turn adjust a focus of the lens; and then maintaining the lens barrel in the adjusted position by said friction.

7. A lens frame comprising:
a lens barrel means containing a lens and having a longitudinal axis;

a support means having an inner surface in which the lens barrel means is inserted and supported;

at least one projected guide means formed as a guide member either on the inner surface of the support means or on the outer surface of the lens barrel means, said projected guide means extending inclined with respect to a plane perpendicular to the longitudinal axis of the lens barrel means, said at least one projected guide means having opposite ends defining a gap in a circumferential direction therebetween; and a pair of projection means formed as a slide member either on the outer surface of the lens barrel means or on the inner surface of the support means, said paired projecting means being so arranged that when the lens barrel means is inserted into the support means such that the lens barrel means is at a specified relative angle with the support means, one of the paired projection means passes through the gap formed between the opposite ends of said projected guide means;

whereby as the lens barrel means, after being inserted into the support means, is rotated, said paired projection means are guided along the inclined projected guide means, moving the lens barrel means axially in the support means thereby to adjust a focus of the lens.

8. A lens frame comprising:
a lens barrel containing a lens and having a longitudinal axis;

a support member having an inner surface in which the lens barrel is inserted and supported, said support member being a longitudinal member;

at least one projected strip formed as a guide member on one of the inner surface of the support member and the outer surface of the lens barrel, said projected strip extending inclined with respect to a plane perpendicular to the longitudinal axis of the lens barrel, said at least one projected strip having opposite ends defining a gap in a circumferential direction therebetween; and a pair of projections formed as a slide member on the other of said outer surface of the lens barrel and said inner surface of the support member, said paired projections being so arranged that when the lens barrel is inserted into the support member such that the lens barrel is at a specified relative angle with the support member, one of said paired projections passes through the gap formed between the opposite ends of said projected strip, wherein said paired projections are pillars with an arc cross section which have a flat surface on one side and an arc surface on the other side so that said paired projections are substantially in line contact with the inclined projected strip at a boundary portion between the flat surface and the arc surface, thereby allowing said paired projections to be smoothly guided along the inclined projected strip whether the inclined projected strip is inclined linearly or curvilinearly;

whereby as the lens barrel, after being inserted into the support member, is rotated, said paired projections receive said inclined projected strip to be guided therealong, moving the lens barrel axially in the support member thereby to adjust a focus of the lens.

* * * * *